US006847983B2

(12) United States Patent
Somalwar et al.

(10) Patent No.: US 6,847,983 B2
(45) Date of Patent: Jan. 25, 2005

(54) APPLICATION INDEPENDENT WRITE MONITORING METHOD FOR FAST BACKUP AND SYNCHRONIZATION OF OPEN FILES

(76) Inventors: Kiran Somalwar, 3824 Stone Point Way, Pleasonton, NJ (US) 94588; Dinesh Sinha, 88 Amy Dr., North Brunswick, NJ (US) 08902

( * ) Notice: Subject to any disclaimer, the term of this patent is extended or adjusted under 35 U.S.C. 154(b) by 499 days.

(21) Appl. No.: 09/794,093

(22) Filed: Feb. 28, 2001

(65) Prior Publication Data

US 2002/0120791 A1 Aug. 29, 2002

(51) Int. Cl.$^7$ .............................................. G06F 17/30
(52) U.S. Cl. ............................ 707/203; 707/9; 715/511
(58) Field of Search .................... 707/1–10, 100–104.1, 707/200–205; 715/511

(56) References Cited

U.S. PATENT DOCUMENTS

| 4,819,156 | A | 4/1989 | DeLorme et al. ............. 714/15 |
| 5,201,044 | A | 4/1993 | Frey, Jr. et al. ............... 714/20 |
| 5,675,725 | A | 10/1997 | Malcolm ........................ 714/6 |
| 5,684,984 | A | 11/1997 | Jones et al. .................... 707/10 |
| 5,684,990 | A | 11/1997 | Boothby ..................... 707/203 |

(List continued on next page.)

FOREIGN PATENT DOCUMENTS

| EP | 0 249 090 | 5/1987 |
| EP | 1 024 441 | 8/2000 |
| JP | 3271841 | 12/1991 |
| WO | WO 98/21648 | 5/1998 |
| WO | WO 98/24018 | 6/1998 |
| WO | WO 98/40805 | 9/1998 |
| WO | WO 99/39284 | 8/1999 |
| WO | WO 00/16222 | 3/2000 |
| WO | WO 00/46698 | 8/2000 |
| WO | WO 00/48096 | 8/2000 |

OTHER PUBLICATIONS

Henry, J. Shirley. "Cause For Concern." *UNIX Review*, Sep. 1987, pp. 47–55.
Moad, Jeff. "Disaster–Proof Your Data." *Datamation*, Nov. 1, 1990, pp. 87–93.
Lubkin, David. "Heterogeneous Configuration Management with DSEE." *ACM*, 1991, pp. 153–160.
Hunt, James J., Kiem–Phong Vo and Walter F. Tichy."An Empirical Study of Delta Algorithms." *Sixth International Workshop on Software Configuration Management in Berlin*, 1996.
Tridgell, Andrew and Paul Mackerras. "The Rsync Algorith Technical Report TR–CS–96–05." *Department of Computer Science, Australian National University*, 1996.
Zhang, Yanchun and Jie Lu. "On Operation Synchronisation in Cooperative Database Processing Environments." *ISCIS XI The Eleventh International Symposium on Computer and Information Sciences*, 1996, pp. 265–273.

(List continued on next page.)

Primary Examiner—Mohammad Ali
(74) Attorney, Agent, or Firm—Walter J. Tencza, Jr.

(57) ABSTRACT

An application independent method for monitoring file system requests made by any application program, storing changes made to a first copy of a selected file by the application program into a first file and synchronizing the selected file, whether the file is open or closed, with a second copy of the selected file. The monitoring and storing process is repeated each time a file system request to write into the selected file is made by the application program to track changes made to the selected file. At the time of synchronization, if the selected file is closed, all the changes that are stored in the first file are applied to a second copy of the selected file. If, however, the selected file is open, a portion of the changes are selected pursuant to a predetermined time period and applied to a second copy of the selected file. As a result, both copies of the selected files are identical, thereby synchronizing them. For open files, both copies of the selected file are identical up to the predetermined time period.

9 Claims, 12 Drawing Sheets

U.S. PATENT DOCUMENTS

| | | | |
|---|---|---|---|
| 5,740,432 A | 4/1998 | Mastors | 707/202 |
| 5,742,792 A | 4/1998 | Yanai et al. | 711/162 |
| 5,758,150 A | 5/1998 | Bell et al. | 707/10 |
| 5,758,355 A | 5/1998 | Buchanan | 707/201 |
| 5,764,905 A | 6/1998 | Catozzi et al. | 709/215 |
| 5,778,388 A | 7/1998 | Kawamura et al. | 707/203 |
| 5,787,415 A | 7/1998 | Jacobson et al. | 707/2 |
| 5,826,021 A | 10/1998 | Mastors et al. | 709/203 |
| 5,943,676 A | 8/1999 | Boothby | 707/201 |
| 5,956,719 A | 9/1999 | Kudo et al. | 707/10 |
| 5,978,813 A * | 11/1999 | Foltz et al. | 707/201 |
| 6,052,695 A | 4/2000 | Abe et al. | 707/202 |
| 6,065,018 A | 5/2000 | Beier et al. | 707/202 |
| 6,067,541 A | 5/2000 | Raju et al. | 707/3 |
| 6,073,141 A | 6/2000 | Salazar | 707/204 |
| 6,081,806 A | 6/2000 | Chang et al. | 707/8 |
| 6,092,083 A | 7/2000 | Brodersen et al. | 707/201 |
| 6,092,087 A | 7/2000 | Mastors | 707/202 |
| 6,119,129 A | 9/2000 | Traversat et al. | 707/202 |
| 6,134,562 A | 10/2000 | Horowitz et al. | 707/202 |
| 6,144,999 A | 11/2000 | Khalidi et al. | 709/219 |
| 6,163,856 A | 12/2000 | Dion et al. | 714/4 |
| 6,169,794 B1 | 1/2001 | Oshimi et al. | 379/221.09 |
| 6,173,292 B1 | 1/2001 | Barber et al. | 707/200 |
| 6,173,377 B1 | 1/2001 | Yanai et al. | 711/162 |

OTHER PUBLICATIONS

Mitchell, Stan. "Monitoring File Activity and MS–DOS/Win32 File System Driver Reference." Chapter 7, *Inside the Windows 95 File System*, O'Reilly & Associates, ISBN: 156592200X.

Nagar, Rajeev. "Filter Drivers, Microsoft Windows NT® IFS Kit and Microsoft Windows 2000 IFS Development Kit." Chapter 12, *Windows NT File System Internals: A Developer's Guide*. O'Reilly & Associates, IBN: 1565922492.

Dhamija, Dinesh. "Synchronization of Information in Multiple Heterogeneous Manufacturing Databases." A Dissertation Presented to The Faculty of Fritz J. and Dolores H. Russ, College of Engineering and Technology, Ohio University, Mar. 1999.

Porto, Fábio A. M. Sèrgio R. Carvalho, Mauŕicio J. Vianna e Silva, and Rubens N. Melo. "Persistent Object Synchronization with Active Relational Databases." *IEEE*, 1999, pp. 53–62.

Cho, Junghoo and Hector Garcia–Molina. "Synchronizing a Database to Improve Freshness." ACDM, 2000, pp. 117–1280.

Bussert, John. "Journaling Grows Up for Smaller Systems; Product Information." Information Access Company, Sep. 18, 2000.

Hunt, James J., Kiem–Phong Vo and Walter F. Tichy. "An Empirical Study of Delta Algorithms." *Sixth International Workshop on Software Configuration Management in Berlin*, 1996.

Tridgell, Andrew and Paul Mackerras. "The Rsync Algorith Technical Report TR–CS–96–05." *Department of Computer Sciences, Australian National University*, 1996.

Mitchell, Stan. "Monitoring File Activity and MS–DOS/Win32 File System Driver Reference." Chapter 7, *Inside the Windows 95 File System*, O'Reilly & Associates, ISBN: 156592200X.

Nagar, Rajeev. "Filters Drivers, Microsoft Windows NT® IFS Kit and Microsoft Windows 2000 IFS Development Kit." Chapter 12, *Windows NT Filey System Internals: A Developer's Guide*. O'Reilly & Associates, IBN: 1565922492.

* cited by examiner

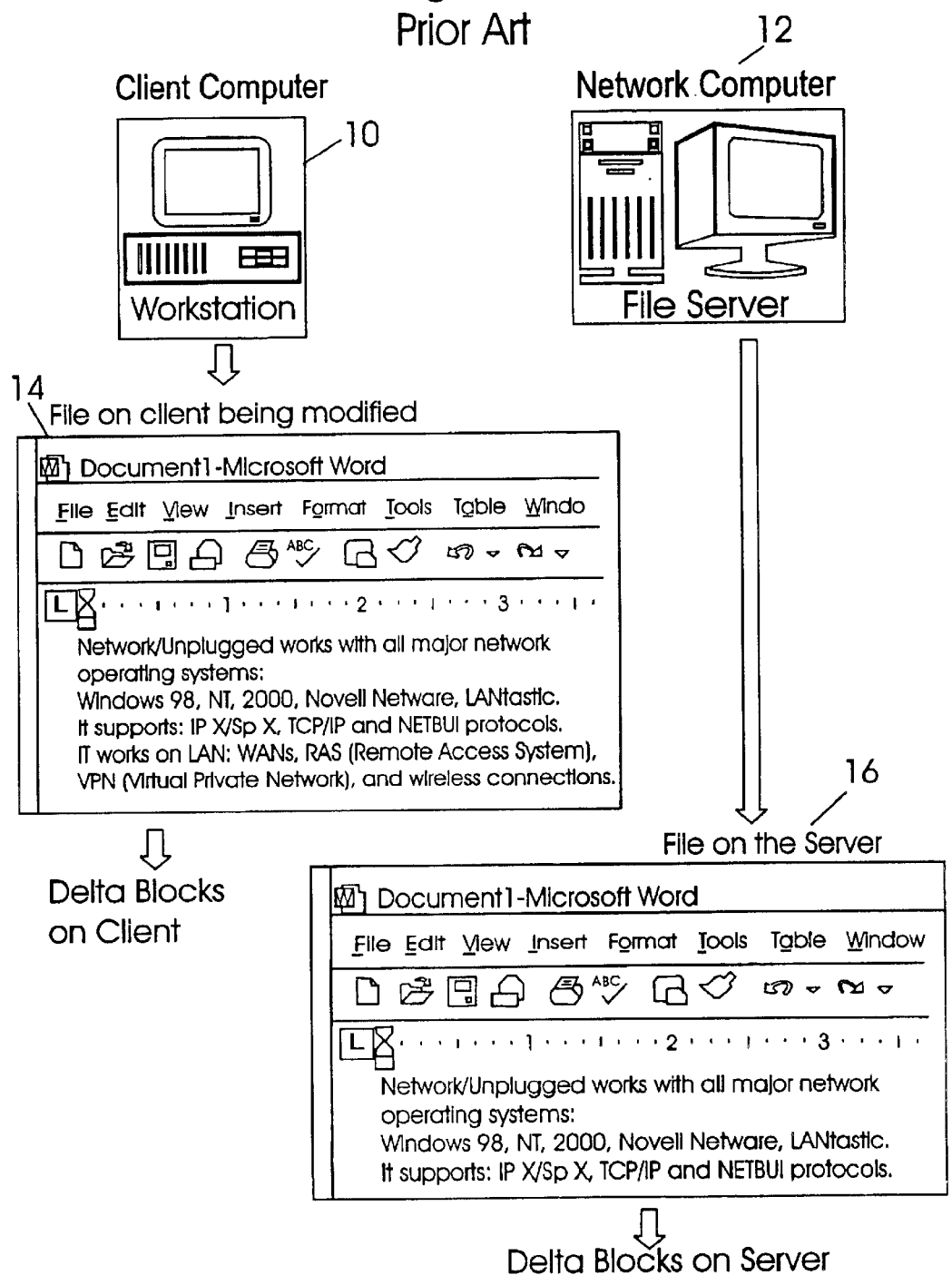

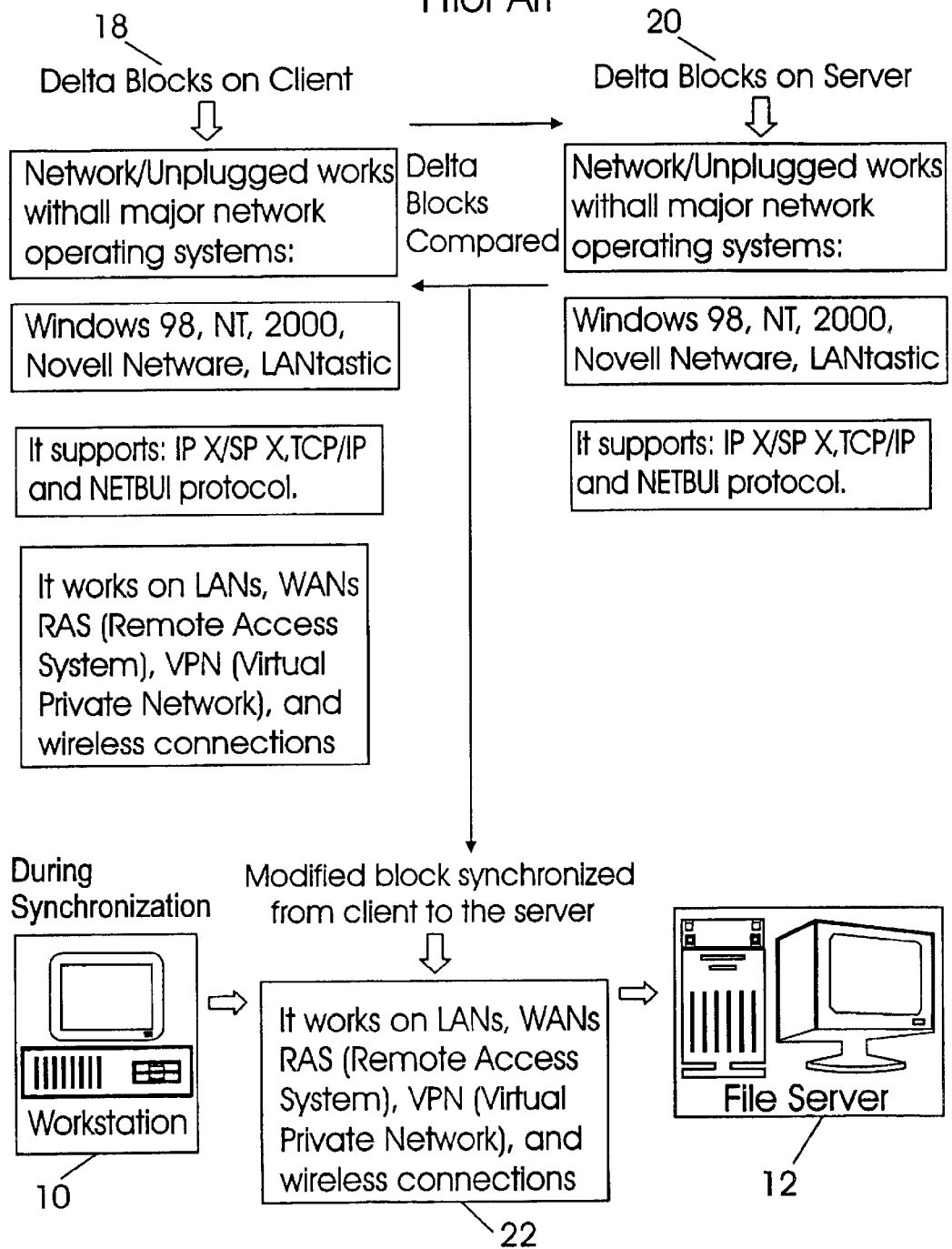

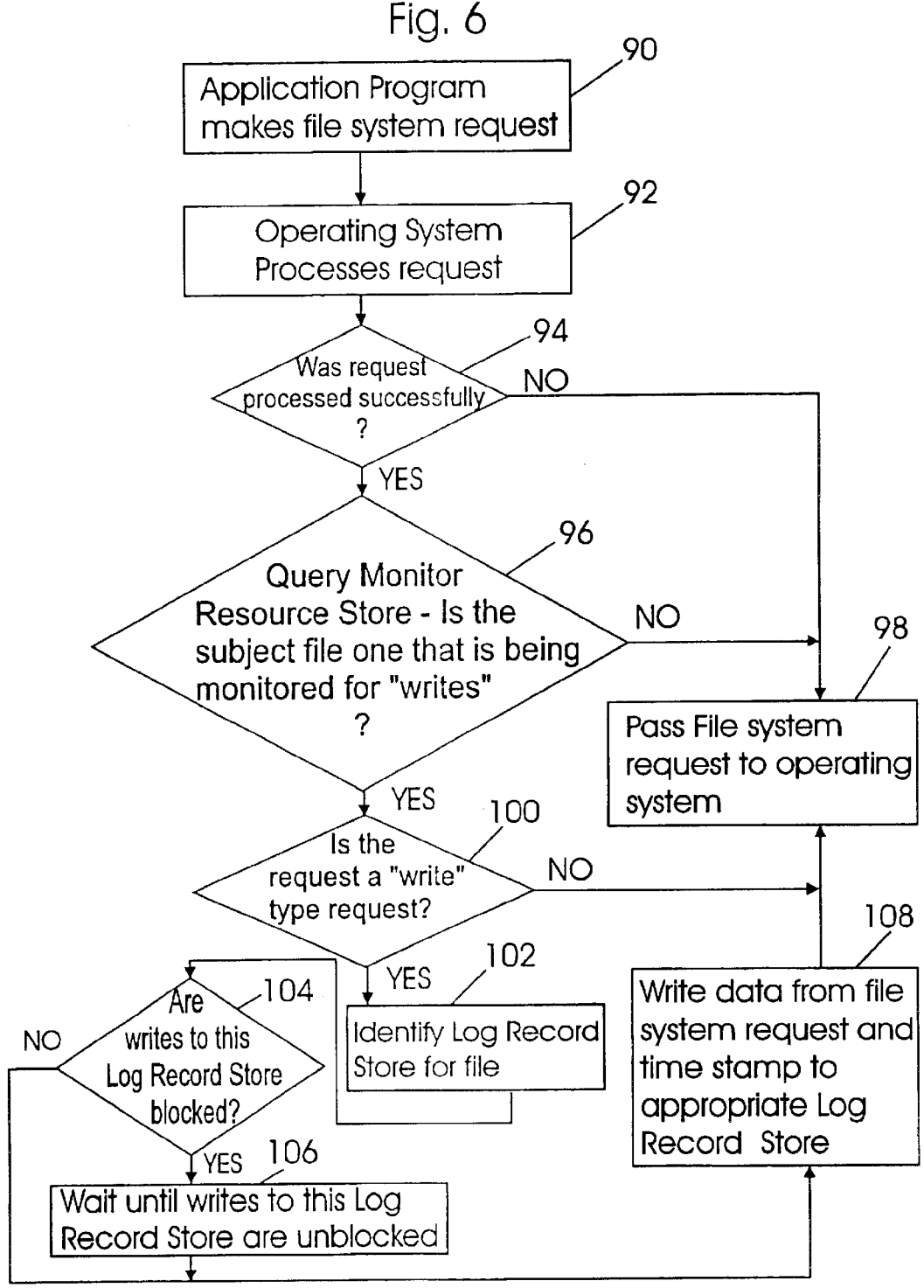

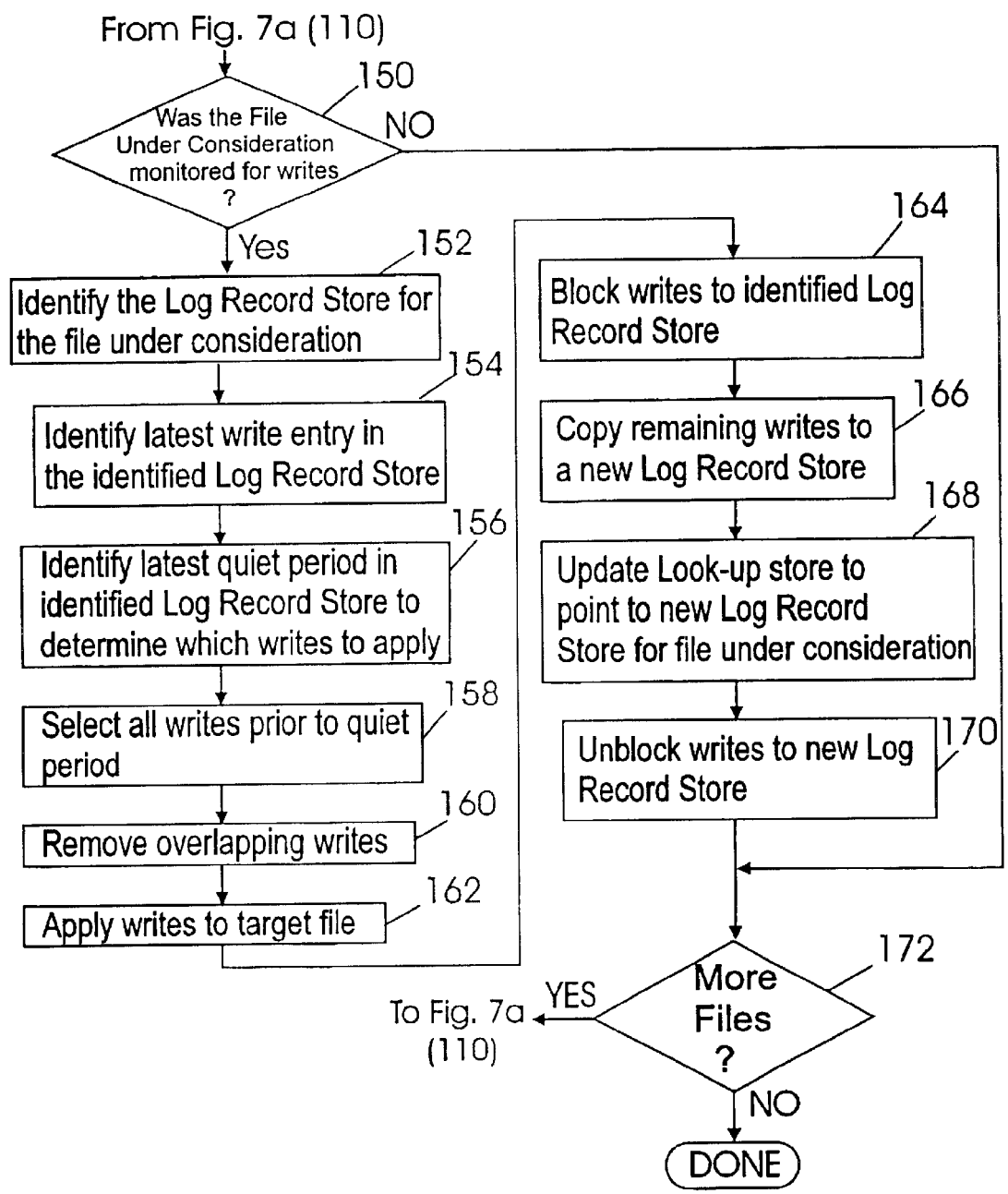

Fig. 8b

| File Identifier | Starting byte of change to file | Number of bytes changed | Changes | Time Stamp |
|---|---|---|---|---|
|  |  |  |  |  |
|  |  |  |  |  |
|  |  |  |  |  |
|  |  |  |  |  |
|  |  |  |  |  |

APPLICATION INDEPENDENT WRITE MONITORING METHOD FOR FAST BACKUP AND SYNCHRONIZATION OF OPEN FILES

FIELD OF THE INVENTION

The present invention is directed to a method for monitoring changes to files and synchronizing the files in a computer system, and more particularly, to an application independent method for monitoring and recording changes to files and then later synchronizing open files in a computer system.

RELATED APPLICATION

This application is related to U.S. patent application Ser. No. 09/794,094, entitled "Application Independent Write Monitoring Method for Fast Backup and Synchronization of Files," filed on even date herewith.

BACKGROUND OF THE INVENTION

Maintaining the integrity of files stored in a computer system is imperative. This is as true for a single user computer as it is for commercial enterprises that support many computers that operate alone or that are interconnected by some sort of computer network. A good practice that is commonly followed by computer users is to copy the files stored on a computer either to a removable medium, e.g., floppy disk or zip drive, or, if available, to mass storage devices on a computer network, e.g., file servers. This process is sometimes referred to as a "backup" process.

This practice may be adequate when the volume of files that are backed up is small or if the files are only maintained locally and there is no need to share files among multiple users. Present day computing, however, is not that simple. To the contrary, present day computer users no longer do business while tethered to a stationary work station in a traditional office environment. Technological progress has led to a surge in mobile and remote computing. Mobile and remote users need to be as productive away from the office as they are when they work in a traditional office setting. To accomplish this desired level of productivity, users need access to network resources and up-to-date information. As a result, enterprise data and information is being stored beyond the traditional office environment and is spread across remote offices, remote personal computers ("PCs"), mobile PCs such as laptops, and Personal Digital Assistants ("PDAs"). Thus, critical data stored on mobile and remote PCs, for example, documents, presentations and e-mail files, which can grow to hundreds of megabytes, are not properly protected nor are they always available to other users. As a result, there is even more of a need to ensure the integrity of files and accessibility of current copies of files to all users now that they may be spread out among remote and mobile computers.

The problem of file integrity is particularly acute for remote and mobile computers in that the information stored on a mobile or remote user's computer may not be stored anywhere else. In addition, in instances where files are maintained on a server in a network environment, the server copy of files may not reflect the latest changes or copy of the files if a mobile or remote user was working on files locally on his mobile or remote computer. Because typical synchronization of such large files (for example, 200 to 300 megabytes) even over a local area network can take about 10 to 20 minutes, users are discouraged from creating copies of this information and thereby synchronize local copies of files with copies stored in the network.

A number of solutions have been proposed to overcome these shortcomings and facilitate the backup and synchronization of files. Traditional methods for backup and synchronization of files are, for example, copying network files and databases to the hard disk of the local PC and then, if appropriate, synchronizing the stored copies with the network copies of the files maintained on one or more network servers. This "copy and synchronize" approach, however, is an inefficient use of network bandwidth in that entire files are copied and transmitted during the backup and synchronization process.

Other techniques utilized by backup and synchronization processes are known as "delta technologies." Known techniques employing delta technologies are so called "block level differencing" (illustrated in FIGS. 1a and 1b) and "byte level differencing" (illustrated in FIGS. 2a and 2b). These techniques are described by James J. Hunt, Kiem-Phong Vo and Walter F. Tichy in "An Empirical Study of Delta Algorithms," Sixth International Workshop on Software Configuration Management in Berlin, 1996, and Andrew Tridgell and Paul Mackerras in "The Rsync Algorithm Technical Report TR-CS-96-05," Department of Computer Sciences, Australian National University, 1996.

In block level differencing, a local copy 14 and a remote copy 16 of a file are divided into "delta" blocks 18 and 20 on a client computer 10 and a server computer 12, respectively. A comparison is made of the respective blocks and the differences between the local and remote delta blocks 18 and 20 are generated and stored in a data structure 22. The data structure 22 is then transferred during synchronization from the client computer 10 to the server computer 12 where the differences are applied to the server copy of the file 16 by a software process running on the server computer 12.

In byte level differencing, the client and server copies of the local copy 14 and the remote copy 16 of the file being synchronized are compared and differences down to the byte level are generated and stored in a data structure 34. This approach produces much smaller differences. The data structure 34 is then transferred from the client computer 10 to the server computer 12 during synchronization so that the differences can be applied to the server copy of the file 16 by a software process running on the server computer 12.

The potential inefficiencies in these processes are apparent. Both require two communication sessions between the client computer 12 and the server computer 14. The first to ascertain the differences between the files and the second to transmit the differences to the server computer 14 so they can be applied to the server copy of the file 16. In addition, because the processes that compute the differences are computationally intensive, they will consume a significant amount of time and a substantial amount of processing resources.

Another known technique that has been utilized to track changes made to database files is known as "database journaling." This technique requires the database application program to keep a journal of all changes made to a database file. These changes are then utilized during synchronization to incorporate changes made in the local copy of the database file to a remote copy of the database file.

This technique, however, is application specific in that it cannot be used to backup and synchronize files for which the application programs modifying the files do not themselves create change journals. In practice, the change journals are applied to synchronize a remote copy of the database. Typically, only high end database applications create change journals. Most popular software application programs, including Microsoft® PowerPoint®, Access, Outlook and Word (all products of the Microsoft Corporation located in Redmond, Wash.), do not create change journals.

None of the foregoing techniques address the issue of how to perform the synchronization process when one or more of the files to be synchronized are still in use by an application program. Normally, only files that are inactive or closed at the time the synchronization process is run are included. This is because application programs typically open files in an "exclusive" mode so that other application programs or processes cannot read or write them when they are opened.

A typical computer user keeps his mail client, such as Microsoft Outlook or Netscape, always running. Similarly, if the user were primarily working on application such as AutoCAD, which is available from Autodesk of Cupertino, Calif., the relevant database may always be open. These opened files cannot be read by other processes and application programs as the application program operating on the files has opened them in "exclusive" mode. Therefore, current techniques (direct copy and different delta differencing methods) used to backup and synchronize files will fail as they need to read the contents of the source file to perform their task.

SUMMARY OF THE INVENTION

The present invention overcomes the shortcomings discussed above by introducing an application independent method for monitoring file system requests made by any application program, storing changes made to a first copy of a selected file by the application program into a first file and synchronizing the selected file, whether it is open or closed, with a second copy of the selected file. The monitoring and storing process is repeated each time a file system request to write into the selected file is made by the application program to track changes made to the selected file.

At the time of synchronization, if the selected file is closed, all the changes that are stored in the first file are applied to a second copy of the selected file. If, however, the selected file is open, a portion of the changes are applied to a second copy of the selected file. Alternatively, at the time of synchronization, all of the entries in the first file up to a latest predetermined time period are selected, and all entries that reflect duplicate changes to the same location within the selected file are removed from the selected entries so that only the latest changes are retained. The non-duplicate changes to the first file are then applied to a second copy of the selected file. In yet another alternative, changes made to the selected file are extracted and stored in a data structure. Entries in the data structure that reflect duplicate changes to the same location within the selected file may alternatively be removed so that only the latest changes to the same location are retained. The data structure, which may alternatively be compressed, is transmitted to a synchronization process, which decompresses the data structure (if necessary) and then applies the changes to a copy of the selected file. As a result, both copies of the selected file are identical, thereby synchronizing them. For open files, both copies of the selected file are identical up to the latest predetermined time period.

The monitoring and storing process is application independent in that it is utilized by an operating system for all file system requests made by any application program. The monitoring and storing process is invoked each time a file system request is made by an application program. The process could be part of the operating system or it could be separate process accessed as needed by the operating system.

The benefits to this approach are a significant reduction in data transfer time to the location where the second copy or backup copy of the file is stored (network server, tape device, zip drive, or other backup device), significant speed up in achieving the task of synchronizing of the file, a significant reduction in central processing unit load during the back up and synchronization process, and a significant ability to backup, synchronize and update files that are open or closed.

BRIEF DESCRIPTION OF THE DRAWINGS

FIGS. 1a and 1b illustrate a prior art process for backup and synchronization known as block level differencing delta technologies.

FIG. 6 illustrates in flow chart form the process of monitoring and storing write requests to a file pursuant to the present invention.

FIGS. 7a and 7b illustrate in flow chart form the process of synchronizing changes to a first copy of a file with a second copy of the file pursuant to the present invention.

FIGS. 8a and 8b illustrate exemplary data structures that may be utilized by the present invention to reflect changes to files.

DETAILED DESCRIPTION

Figure 2A:
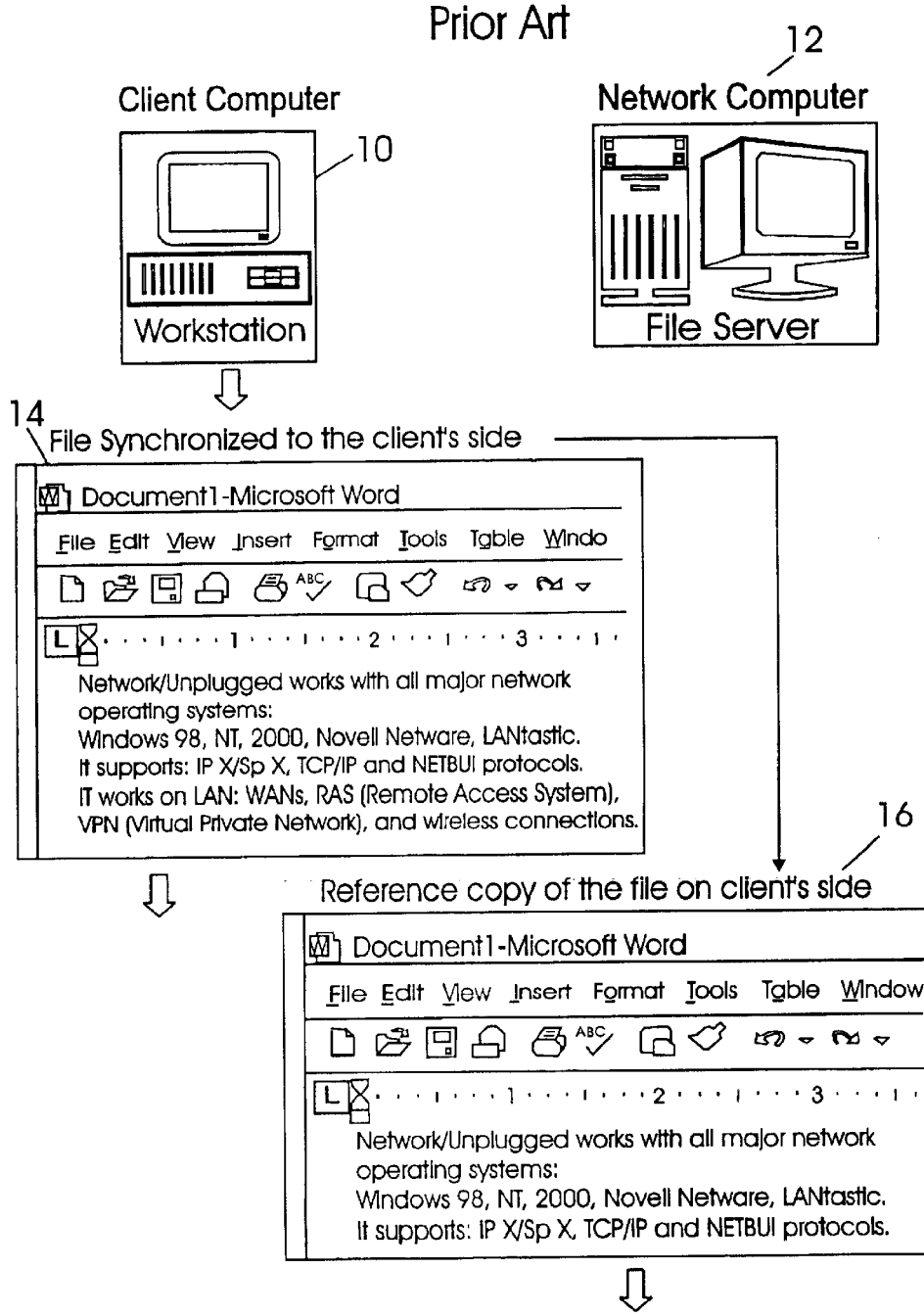
FIGS. 2a and 2b illustrate a prior art process for backup and synchronization known as byte level differencing delta technologies.
Figure 2B:
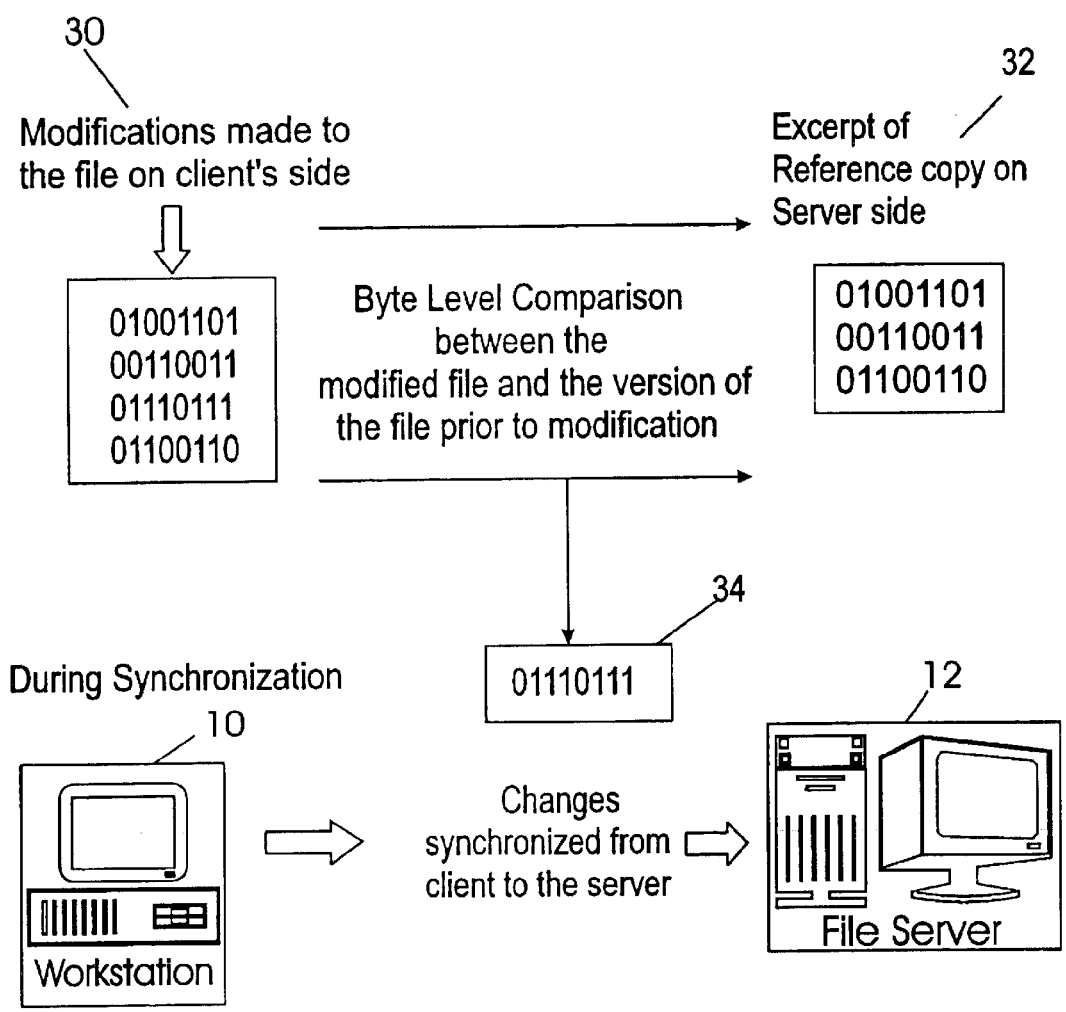

A method for backing up and synchronizing open and closed files in a computer is described. In the following detailed description, numerous specific details are set forth regarding the process and the environment in which the process may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Also, the same references numerals are used in the drawings and in the description to refer to the same elements.

Figure 3:
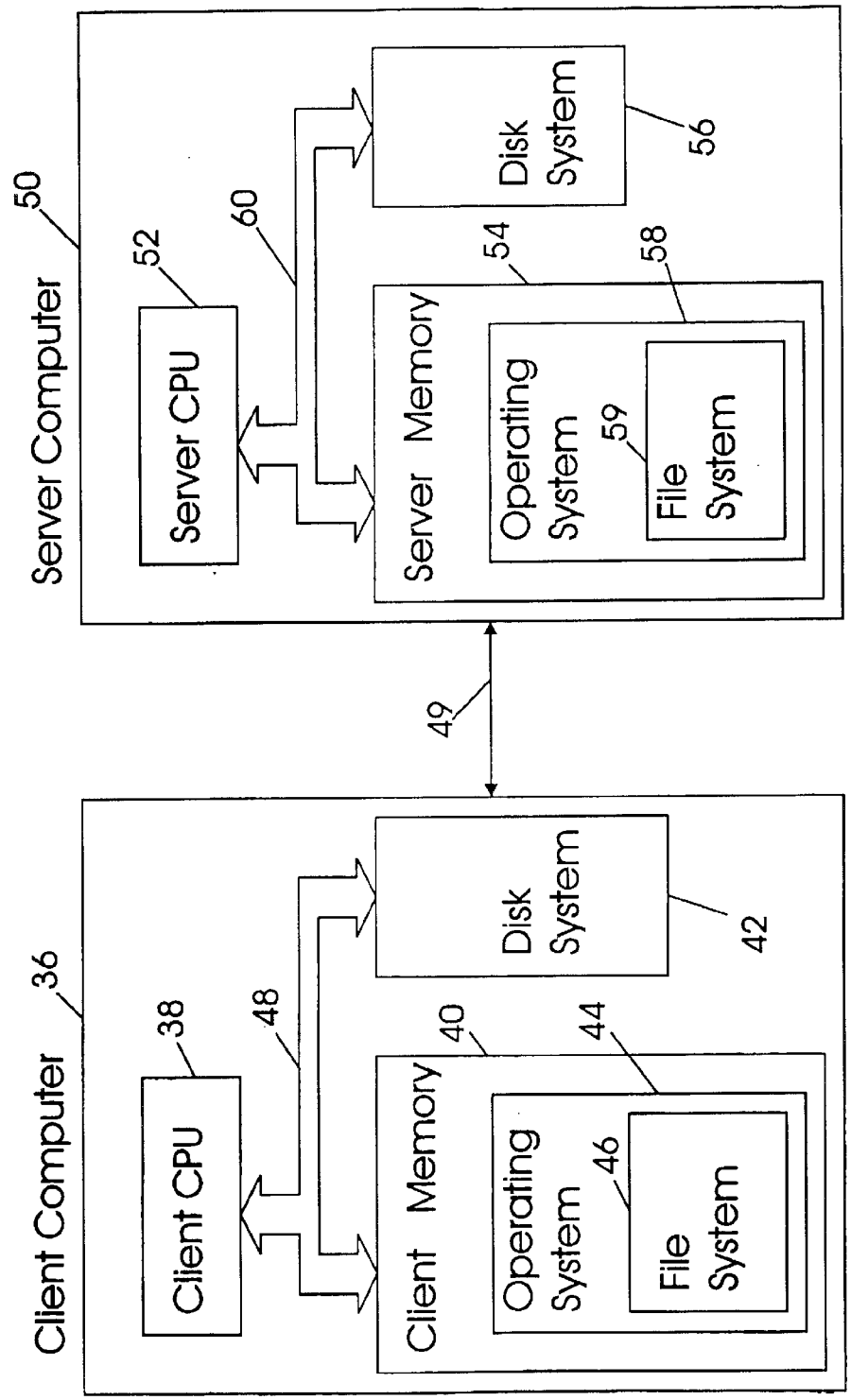
FIG. 3 illustrates an exemplary computing environment for employing the present invention.

Referring now to the drawings and, initially to FIG. 3, there is illustrated an exemplary computing environment for employing the present invention. The exemplary environment comprises two computers here identified as a client computer 36 and a server computer 50. The client computer 36 comprises a client Central Processing Unit ("CPU") 38, a client memory 40 and a disk system 42. The client memory comprises an operating system 44, which itself comprises a file system 46. The client CPU 38, the client memory 40 and the disk system 42 are coupled by a system bus 48. The client memory 40 is a computer readable medium, which in at least some embodiments of the present invention could be a transmission. The client computer 36 could be a desktop personal computer, a laptop computer, a PDA, or any other type of computing device that is capable of running application programs and storing files.

The server computer 50 comprises a server CPU 52, a server memory 54, and a disk system 56. The server memory 54 comprises an operating system 58, which itself comprises a file system 59. The server CPU 52, the server memory 54 and the disk system 56 are coupled by a system bus 60. The server memory 54 is computer readable medium, which in at least some embodiments of the present invention could be a transmission. The server computer 50 could be a Sun Solaris™ server (available from Sun Microsystems, Inc. located in Palo Alto, Calif.) or a PC running, for example, any one of Windows NT®, Windows® 2000 (both products of the Microsoft Corporation), Netware, NFS, Lantastic, Linux, Solaris™, or UNIX operating systems. It should be understood that the foregoing list of operating system is not meant to be exhaustive. The client computer 36 and the server computer 50 are shown as being interconnected via a communication path 49, which could be a direct physical connection, a local area network ("LAN"), a wide area network ("WAN"), a wireless network, the world-wide web, the Internet, an intranet, RAS, Virtual Private Network ("VPN"), direct cable connection, or any other type of interconnection that allows computers to communicate.

Figure 4:
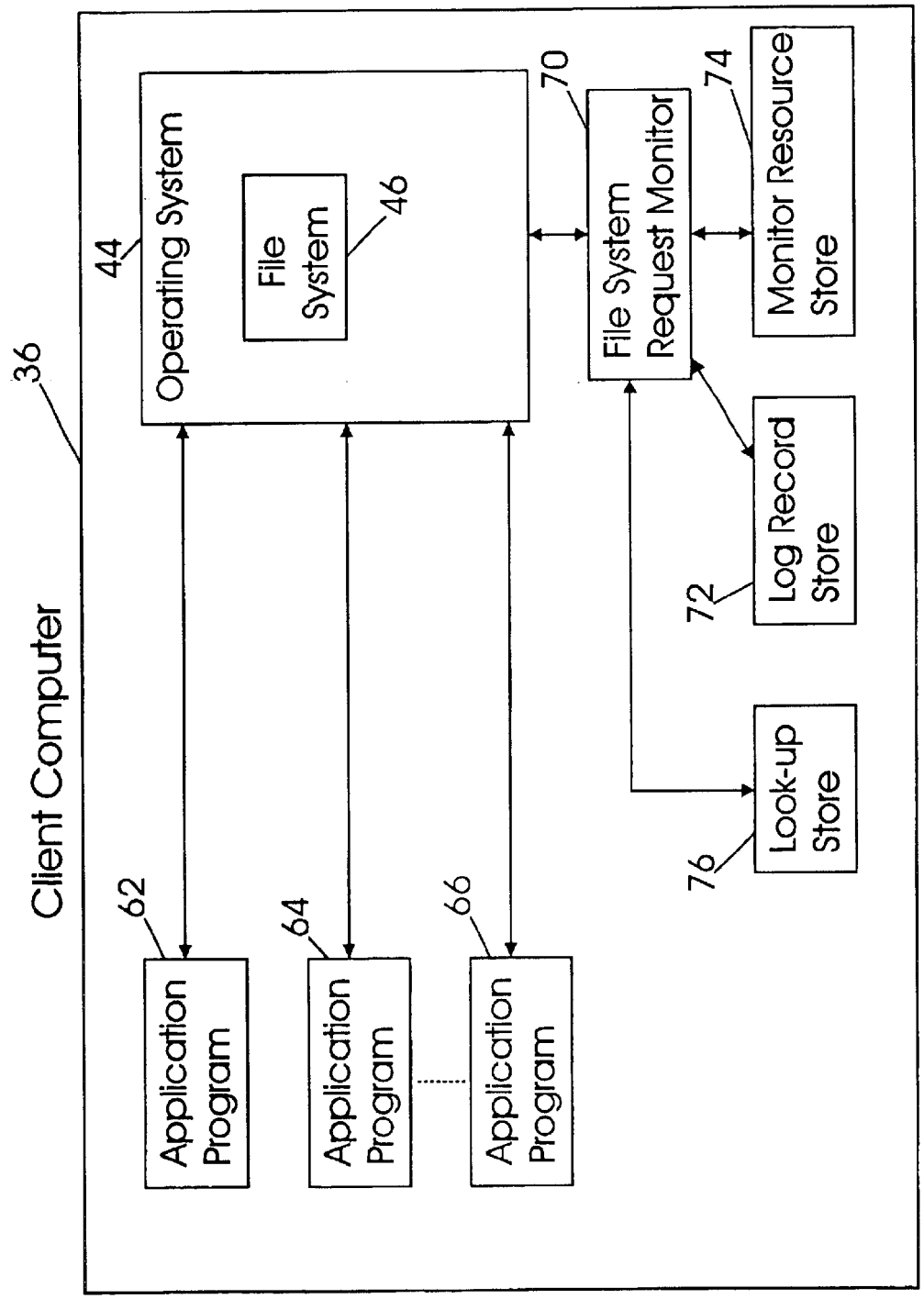
FIG. 4 illustrates in a logic diagram the processes for monitoring file system requests according to the present invention.

FIG. 4 illustrates in a logic diagram format the organization of the processes for monitoring file system requests according to the present invention. The processes are shown as being resident on the client computer 36. It should be understood that these processes could also be resident on the server computer 50. As illustrated, the client computer 36 supports a number of application programs 62, 64 and 66, which could be any commercially available software packages such as Microsoft® PowerPoint®, Outlook or Word. The application programs 62, 64 and 66 could be open and running at the same time or opened and closed as needed.

When one or more application programs 62, 64 and 66 are active, the client CPU 38 (FIG. 3) is executing the programs. The active application programs interact with the operating system 44, which could be, for example, Windows® 95, Windows® 98, Windows® Me, Windows NT®, or Windows® 2000, all of which are available from the Microsoft Corporation. One of the many well known functions carried out by the operating system 44 is to process requests to access memory by an application program. The file system 46 is managed by the operating system 44.

Also shown in FIG. 4 are a file system request monitor 70, a log record store 72, a monitor resource store 74 and a look-up store 76. The file system request monitor 70 is a process that is invoked by the operating system 44 each time one of the application programs 62, 64 and 66 make a file system request. The file system request monitor 70 could be part of the operating system 44 or it could be a separate process accessed as needed by the operating system 44. The operation of the file system request monitor 70 will be more fully explained below in connection with FIGS. 5 and 6. The monitor resource store 74 is a file that comprises an identification of file resources to be monitored by the file system request monitor 70. The log record store 72 is where changes made to a monitored file are stored. The look-up store 76 is a file that is used to map the identities of files that are monitored (stored in monitor resource store 74) with the associated log record store 72 for each file being monitored.

It should be understood by one skilled in the art that portions of the file system request monitor 72, the operating system 44, the file system 46, and the application programs 62, 64 and 66 are pulled into the client memory 44 from the disk system 42 by the client CPU 38 as needed. Similarly, if implemented on the server computer 50, the portions of the file system request monitor 72, the operating system 58, the file system 59, and the application programs 62, 64 and 66 are pulled into the server memory 54 from the disk system 56 by the server CPU 52 as needed.

It will be more fully explained that the present invention can utilize multiple log record stores 72, one for each file resource identified in the monitor resource store 74, or it can use one log record store 72 where changes for all file resources identified in the monitor resource store 74 are stored. The look-up store 76 is not utilized when one log record store 72 is used to store all changes.

The identification of the file resources in the monitor resource store 74 can be accomplished several ways. It should be understood that this description is exemplary. It is contemplated that there are other methods that are within the scope of the present invention. One way to identify them is by storing their file names in the monitor resource store 74. A second way is to identify directories of files to be monitored by storing the pathnames of the directories in the monitor resource store 74. This approach will result in the monitoring of all files within the identified directories. Additional ways to identify files to be monitored would be to store the extensions of the files or the size range of the files. Example specifications of file resources to be monitored in the monitor resource store 74 are C:\My Documents\*.*, which would cause all files in the C:\My Documents directory to be monitored and C:\UserData\maildata\*.pst, which would cause all files in the C:\UserData\maildata directory with a "pst" file extension to be monitored.

The look-up store 76 illustrated in FIG. 4 may include a header structure and a plurality of look-up records. The fields comprising the header structure indicate the number of entries or records in the look-up store 76. The look-up records comprise a number of fields such as (1) the file name of the file being monitored (2) the corresponding log record store 72 for the file.

The operation of the file system request monitor 70 will now be explained in connection with FIGS. 5 and 6. It should be understood that this description is exemplary. It is contemplated that there are other methods that are within the scope of the present invention.

For the purposes of this description, it is assumed that the file resources to be monitored have already been identified, the identity of the file resources are stored in the monitor resource store 74 and the names of the files to be monitored are mapped to their corresponding log record store 72 in the look-up table 76. For this example, only application program 62 will be active on the client computer 36 to simplify the explanation. Moreover, the explanation is centered around the monitoring of files on the client computer 36 and the synchronization of files on the client computer 36 with files on the server computer 50. It should be understood the roles could be reversed and the monitoring of files could be on the server computer 50 and the synchronization process could synchronize files on the server computer 50 with files on the client computer 36.

The user of client computer 36 invokes the application program 62, which causes client CPU 38 to activate the application program 62. Once it is active, the user of the client computer 36 can work with any files stored on the client computer 36 or files stored on the server computer 50.

Figure 5:
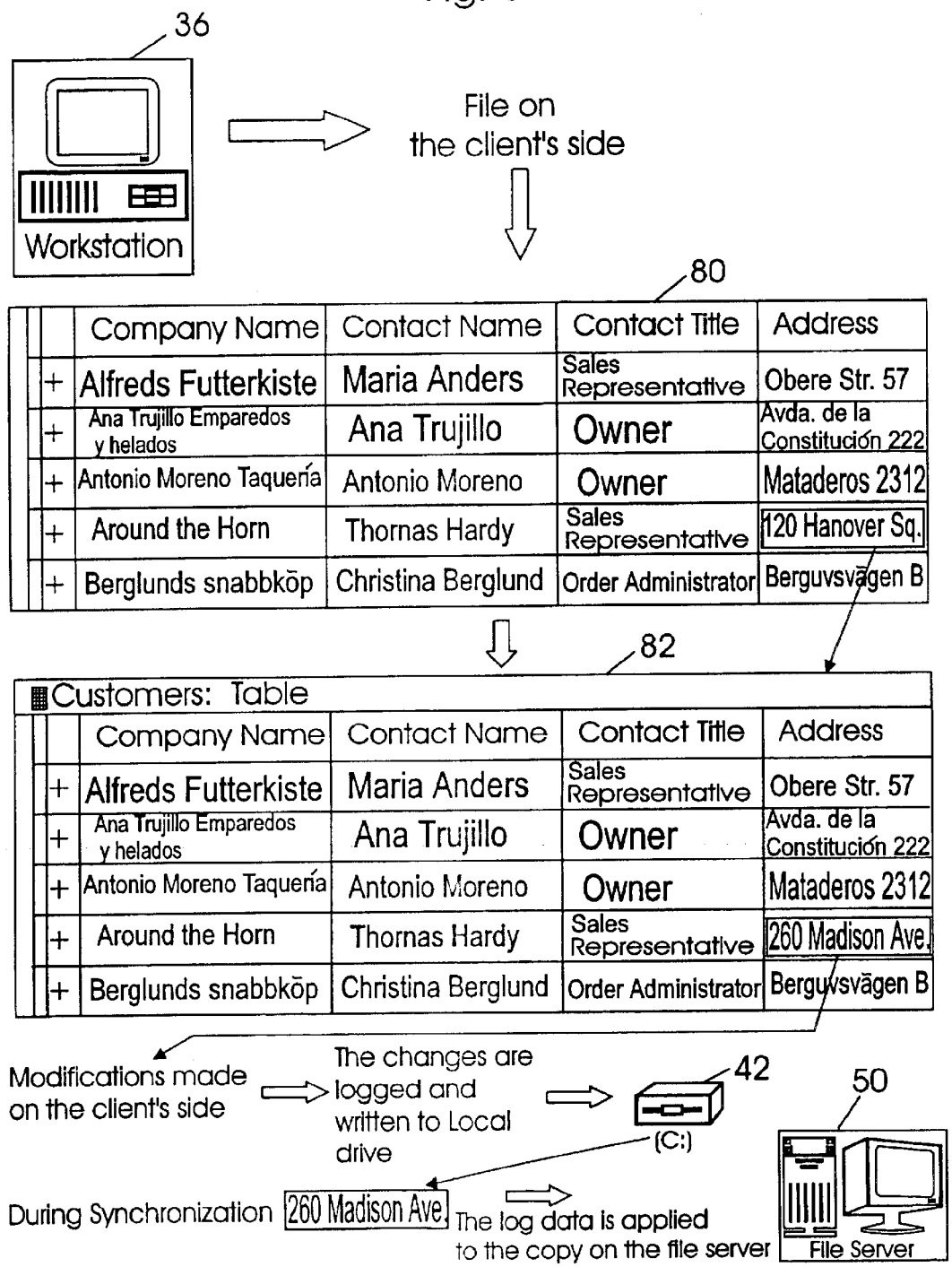
FIG. 5 illustrates an exemplary process for monitoring file system requests for a file maintained on a client computer and subsequently synchronizing the changes made to a copy of the file on a server computer.

The user selects a particular file, the application program 62 issues a request to the operating system 44 to "open" the requested file, which for this example is shown on FIG. 5 as file 80. The user decides to change an entry in the file 80. The particular entry chosen is "120 Hanover Sq.," which the user changes to "260 Madison Avenue" (see block 82 on FIG. 5). The user then selects through the application program 62 to save this change. The application program 62, in turn, makes a write request to the file 80 as shown in step 90 of FIG. 6. The request is received by the operating system 44 and processed in step 92. Because it is a file system request, the operating system 44 invokes the file system request monitor 70, which then determines if the operation was successful in step 94. If it was not, control is returned to the operating system 44 (step 98). If it was, the file system request monitor 70 in step 96 queries the monitor resource store 74 to determine if the file 80 was listed as a file resource to be monitored. If it is not, control is returned to the operating system 44 as shown in step 98. If the file 80 is included in the monitor resource store 74, the file system request monitor 70 next determines in step 100 if the file system request is a "write" type of request meaning that the application program 62 desires to change data in the file 80. If it is not, control is returned to the operating system 44 as shown in step 98. If it is a write request, the file system request monitor 70 accesses the look-up store 76 to identify the log record store 72 for the file 80 as shown in step 102. A check is then made to determine if writes are blocked to the log record store 72 for the file under consideration (step 104). This "blocked" state is explained further in connection with FIG. 7b. If it is blocked, the process waits until writes to the log record store 72 for the file under consideration are unblocked. Control is passed to step 108 (as it would if writes were not blocked) where the file system request monitor 70 stores the write data in the log record store 72 representative of the change that the application program 62 makes to the file 80 along with a time stamp to indicate the current system time the change was made. Control is then returned to the operating system 44.

In exemplary operating systems 44 of Windows® 95, Windows® 98, Windows® Me, time stamps are generated by making a "Get_System_Time" call, which is documented in the Device Driver Kits for these operating systems and is available from the Microsoft Corporation. In alternative, exemplary operating systems 44 of Windows NT® or Windows® 2000, time stamps are generated by making a "KeQuerySystemTime" call, which is documented in the Device Driver Kits for these operating systems and is available from the Microsoft Corporation. Data returned from the calls (current system time) is stored in the log record store 72. It should be understood that this description is exemplary. It is contemplated that there are other methods that are within the scope of the present invention.

The log record store 72 used in the previous description is only used to log changes to the file 80. Entries in the log record store 72 would be organized in a data structure such as that illustrated in FIG. 8a. There it is shown how the file system request monitor 70 tracks changes to the file 80. The data structure 130 is divided into a first field 132 that indicates the starting byte in the file 80 where the change is made, a second field 134 that indicates the number of bytes in the file 80 that were changed and a third field 136 that shows the actual changes that were made. Using the example shown in FIG. 5, the information stored in the third field 136 would be a binary representation of "260 Madison Avenue." It should be understood that there would be a separate entry in the data structure 130 of the log record store 72 for each write request made by the application program 62, i.e., each time a change is made to the file 80.

The log record store 72 can also be configured to log changes for all files that may be changed by the user of the client computer 36. If only one log record store 72 is used, step 102 in FIG. 6 can be skipped. In this alternative embodiment, a fourth field 138 is added to the data structure 130 as illustrated in FIG. 8b. Information written in the fourth field 138 is used to identify the file that is being changed. A new entry in the data structure 130 of the log record store 72 would be added for each change made to a file stored on the client computer 36 provided, however, that the file is identified as a file to be monitored in the monitor resource store 74.

The process described above is repeated each time the user of the client computer 36 indicates to the application program 62 to make a change to the file 80 or if changes are made by the application program 62 without any user request or intervention. As is apparent, during a session with the application program 62, numerous changes could be made to the file 80. Some of the changes may result in the same locations in the file 80 being changed more than once. All changes are entered in the log record store 72.

Figure 7A:
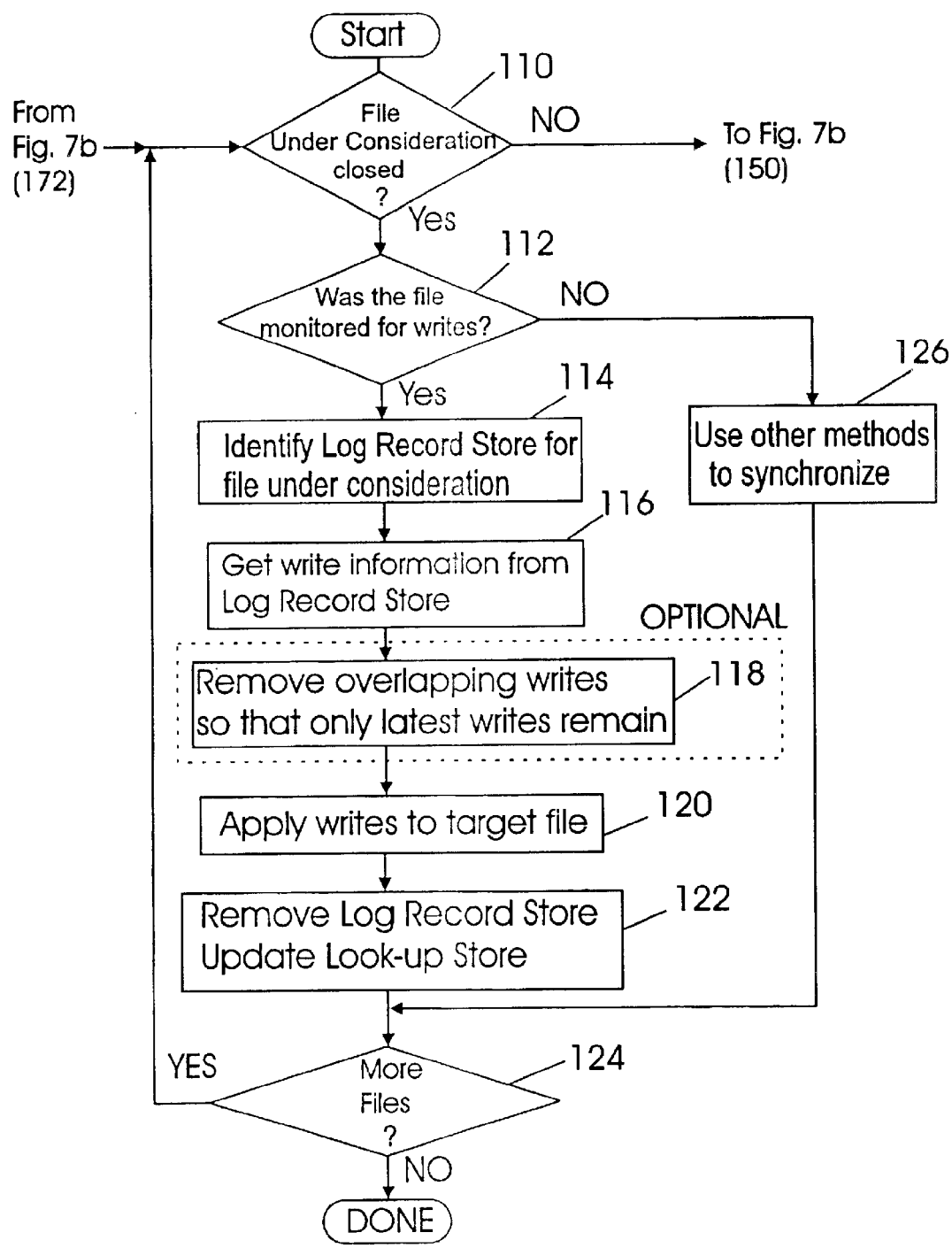

FIG. 5 also shows that during synchronization, the data from the log record store 72 is applied to the copy of the file maintained on the server computer 50. Reference is made to FIGS. 7a and 7b to illustrate the synchronization process. It should be understood that this description is exemplary. It is contemplated that there are other methods that are within the scope of the present invention.

In step 110, a check is made to ascertain if the file under consideration is closed. If the file is not closed, control passes to step 150 of FIG. 7b, which is described below. If it is determined that the file is closed, step 112 is executed to check the look-up store 76 to determine if the file being processed has been monitored for writes. If it is not, the synchronization process employs any known method—such as those described in the background section—to synchronize the copy of the file on the client computer 36 with the copy of the file on the server computer 50 as shown in step 126. Control would then pass to step 124 to determine if there are any additional files stored on the client computer 36 that need synchronization. If, however, the file being processed is a file resource designated as one to be monitored for writes, the log record store 72 for the file under consideration is identified in step 114 by accessing the look-up store 76. Next, the write information stored in the log record store 72 for the file under consideration is retrieved in step 116. Next, an optional processing step can be performed (step 118) to remove all overlapping writes to the same locations in the file so that only the latest writes are retained. This can be accomplished using well known techniques to examine the first field 132 (FIGS. 8a and b) to identify entries in the data structure 130 that recorded writes to the same location in the file under consideration.

After step 118 is complete (if included), the remaining writes are then applied to the copy of the file under consideration stored on the server computer 50 in step 120. This can be accomplished using at least two different approaches. It should be understood that this description is exemplary. It is contemplated that there are other methods that are within the scope of the present invention.

One approach is to apply the writes to the copy of the file maintained on the server computer 50 directly from the client computer 36. An exemplary way to accomplish this is to maintain a mapping table of the files and directories on the client computer 36 that are being synchronized to the corresponding files and directories on the server computer 50. This is standard information that any synchronization application maintains—namely the corresponding pairs of directories or files being synchronized. Using the mapping table of the files and directories on the client computer 36 and the server computer 50, the client synchronization process can directly apply the writes to the copy of the file maintained on the server computer 50.

A second approach would be to employ a server synchronization process on the server computer 50 that would manage the step of applying the writes to the copies of files on the server computer 50. The server synchronization process can be utilized in configurations where one or more server computers are interconnected with one or more client computers. It can reside on one of the server computers and handle all synchronization processing for the files stored on all server computers.

Figure 8A:
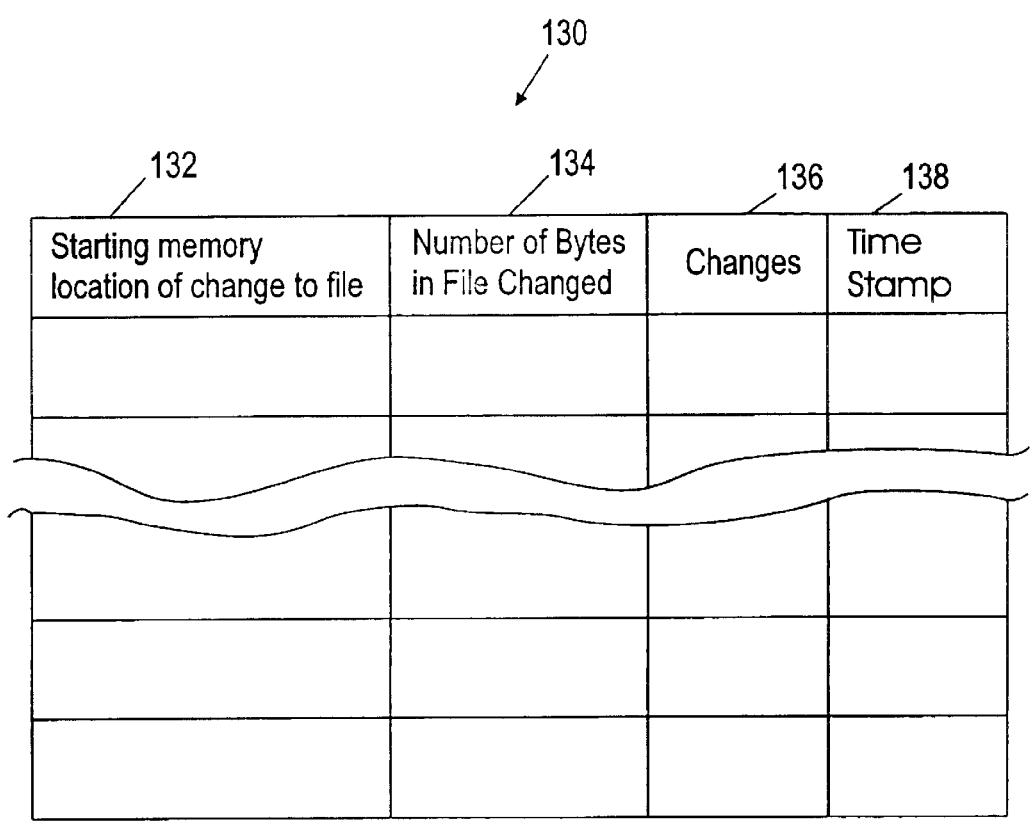

Under the server synchronization process approach, the client synchronization process would build a data structure like that depicted in FIGS. 8a and 8b, depending on whether it was desired to transfer all changes for all files in one data structure (FIG. 8b) or to transfer changes in separate data structures for each file monitored (FIG. 8a). Either way, after the data structure is built, the client synchronization process may compress the data structure(s) using known compression techniques such as those used in common commercially available compression packages like WinZip, and then transmit the data structure(s) to the server computer 50. When the data structure(s) is received, it is then decompressed, again using well known corresponding decompression techniques (if needed). The writes are then applied to the copies of the files maintained on the server computer 50 by the server synchronization process.

After the writes are applied to the copy of the file on the server computer 50, the log record store 72 for the file under consideration is removed as is the entry in the look-up store 76 that associated the file under consideration to the log record store 72 (step 122). Control is then passed to step 124 where a check is made to determine if any more files need to be synchronized. If there are, control passes back to step 112 and the foregoing process is repeated for the next file. If there are no more files, the process is complete.

If during step 110 it is determined that the file under consideration is open, control is passed to step 150 shown in FIG. 7b. There step 150 is executed to check the monitor resource store 74 to determine if the file under consideration is a file resource designated as one to be monitored for writes. If it is not, control would then pass to step 172 to determine if there are any additional files stored on the client computer 36 that need synchronization. If, however, the file being processed is a file resource designated as one to be monitored for writes, the log record store 72 for the file under consideration must be identified in step 152 by accessing the look-up store 76. Once the log store 72 is identified, the latest write entry stored in the log record store 72 for the file under consideration is identified in step 154. The synchronization process then scans backwards, in reverse chronological order, through the write entries in the log record store 72 to identify a "quiet period" as shown in step 156. A quiet period is a period of relative inactivity for the file under consideration. A quiet period is identified by scanning the time stamps for each write entry in the log record store 72 and looking for a time period between entries of relative inactivity for the file under consideration, for example, a two minute or more interval between write entries. It should be understood, however, that the quiet period may be different for different files, and for different operating systems, and for different usage patterns.

Once the quiet period is found, all entries that preceded in time the quiet period are selected in step 158. Next, an optional processing step can be performed (step 160) to remove all overlapping writes to the same locations of the selected write entries so that only the latest writes are retained. This can be accomplished using well known techniques to examine the first field 132 (FIGS. 8a and b) to identify entries in the data structure 130 that recorded writes to the same location in the file under consideration. After step 160 is complete (if included), the remaining writes are then applied to the copy of the file under consideration stored on the server computer 50 in step 162. This can be accomplished using the at least two different approaches discussed above for the synchronization process for closed files.

After the writes are applied to the copy of the file on the server computer 50, the log record store must be updated so that the writes that have been applied can be removed from the log record store 72 and it can accept new write entries. To do this, all write requests from the file system request monitor 70 to the log record store 72 under consideration must be blocked as shown in step 164. The remaining write entries after the quiet period in the log record store 72 for the file under consideration are moved to a new log record store 72 in step 166. Next, the look-up table 76 is updated to point to the new log store 72 for the file under consideration in step 168. Once this is accomplished, write requests to the file under consideration are unblocked in step 170. Control then passes to step 172 where a check is made to determine if any more files need to be synchronized. If there are, control passes back to step 110 in FIG. 7a and the foregoing process is repeated for the next file. If there are no more files, the synchronization process is complete. If one log record store 72 is used to track changes for all files, steps 166 and 168 would be replaced by a step that only removes the writes applied to the second copy of the files from the log record store 72.

Blocking and unblocking of writes to the log record store 72 (steps 164 and 170) may be achieved, for example, by employing "Mutex" objects, which protect shared resources from simultaneous access by multiple threads or processes. It should be understood that this description is exemplary. It is contemplated that there are other methods that are within the scope of the present invention. A "Mutex" is a synchronization object that is "entered" when it is owned by a thread, and "released" when it is not owned by any thread. Only one thread at a time can own a Mutex. Other threads requesting the Mutex will have to wait until the Mutex is released.

In the present invention, the log record store 72 is a shared resource. Mutexes can be used as a gate to ensure that simultaneous modifications are prevented to the log record store 72. In an exemplary operating system 44 environment of Windows® 95, Windows® 98 or Windows® Me, the calls used for manipulating Mutexes are "_CreateMutex," "_EnterMutex," and "_LeaveMutex." These calls are documented in the Device Driver Kits for Windows® 95, Windows® 98, Windows® Me, available from the Microsoft Corporation, and are well known to one skilled in the art. In an operating system 44 environment of Windows NT® or Windows® 2000, the system defined object is of type PKMUTEX, and the calls that will be used are "KeWaitForSingleObject" and "KeReleaseMutex." These calls, which are well known to one skilled in the art, are documented in the Device Driver Kits for Windows NT® and Windows® 2000, and are available from the Microsoft Corporation.

In an exemplary operating system 44 environment of Windows® 95, Windows® 98, Windows® Me, Windows NT®, or Windows® 2000, the Mutex to block and unblock writes to the log record store 72 is maintained at the system or driver level, as opposed to application level. It is at this level because the file system request monitor 70 is operating at the system or driver level. Mutexes at the system driver level are not visible and cannot be manipulated directly by application programs. For the Mutex to work with the synchronization or backup process, which may be running at the application level, the synchronization process needs to communicate with a separate driver level process to ensure that actions on the Mutex to block and unblock writes on the log record store 72 are executed (as required in steps 164 and 170).

The synchronization process communicates with the driver level process using "DeviceIoControl" API calls, which is documented in the Software Development Kits for Windows® 95, Windows® 98, Windows® Me, Windows NT®, and Windows® 2000, also available from the Microsoft Corporation, and is well known to one skilled in the art. Using the DeviceIoControl API calls, the synchronization process can cause the driver level process to enter and release the Mutex appropriately, and thereby effect the blocking and unblocking of writes to the log record store 72. It should be understood that the driver level process could be part of the file system request monitor 70.

As explained above, when the file system request monitor 70 is installed, the operating system 44 invokes the file system request monitor 70 on any calls to the file system 46 received from any one of the application programs 62, 64 or 66. In an operating system 44 environment such as Windows® 95, Windows® 98, or Windows® Me, the file system request monitor 70 is installed using an Application Programming Interface ("API") hook known as "IFSMgr_InstallFileSystemApiHook." Alternatively in an operating system 44 environment such as Windows NT® and Windows® 2000, the file system request monitor 70 is installed as a filter driver into the operating system 44. As would be understood by one skilled in the art, similar techniques can be used if the operating system 44 environment is an operating system such as UNIX, Solaris™, or Linux. The foregoing operating system environments are only meant to be exemplary. It is contemplated that there are other methods that are within the scope of the present invention.

Before describing how the file system request monitor 70 can be implemented in two different sets of operating systems, a description of how files may be handled by the file system request monitor 70 is first described. It should be understood that this description is exemplary. It is contemplated that there are other methods that are within the scope of the present invention.

The file system request monitor 70 monitors "write" type requests and logs them into the log record store 72. However, in many operating systems, including Microsoft® Windows® 95, 98, Me, and Windows NT® and Windows® 2000, the file system request monitor 70 would also need to monitor "open" and "close" calls by the operating system. In many operating systems it is typical that writes and reads are made to files by first issuing an "open" request using the name of the file as one of the parameters of the request. The operating system then returns a unique "handle," which is typically a 32 or 64 bit binary value that corresponds to the file to be used by the application for further actions. The application then makes "read" and/or "write" requests to the file using the assigned file handle. As used in this manner the handle is a proxy for the file. The application then issues a "close" request once it no longer needs to make requests on the file using the handle. Thus, the file system request monitor 70 needs to translate handles to file names, so that it can determine whether to log the particular request or not.

The following is one exemplary implementation of a mapping mechanism between file names and handles. It should be understood that this description is exemplary. It is contemplated that there are other methods that are within the scope of the present invention.

On a successful "open," after verifying that the file is to be monitored by looking up the file in the monitor resource store 74, an entry is added into a "handle-to-name" translation table, which is created by the file system request monitor 70. The table comprises two fields, which are a handle field and a file path field. On a successful "close," the entry corresponding to the handle is deleted from the handle-to-name translation table. On a "write" request, the handle from the request is looked up in the handle-to-name translation table to locate the file name. The corresponding file name is checked against the monitor resource store 74 to verify that the file is to be monitored. The log record store 72 corresponding to the file (based upon the file name) is determined by performing a look-up operation in the look-up store 76. The file system request monitor 70 is then able to save the requested changes into the appropriate log record store 72.

The foregoing mapping mechanism between file names and handles can be further optimized as follows. On a successful "open," after verifying that the file is to be monitored by locating the file in the monitor resource store 74, an entry is added to a handle table, which is created by the file system request monitor 70. The handle table comprises a plurality of records, each having two fields—a handle for the file being monitored and the handle of the corresponding log record store 72. The entry added corresponds to one of the plurality of records. On a successful "close," the entry corresponding to the file name handle is deleted from the handle table. On a "write" request, the handle from the request is looked up in the handle table to locate the file name handle. The corresponding log file name handle is the file handle used for storing the write request in the appropriate log record store 72. The file system request monitor 70 is then able to save the requested changes into the appropriate log record store 72. The handle table, however, may need to be updated if writes remain in the log record store 72 after synchronization. This would be the case when synchronizing open files. The handles need updating so that they point to the new log record store 72.

Turning now to exemplary implementations for specific types of operating systems, an exemplary embodiment is described for a first set of operating systems—Windows® 95, Windows® 98, or Windows® Me. This is only meant to be exemplary. It is contemplated that there are other methods that are within the scope of the present invention.

In this exemplary embodiment, the API hook known as "IFSMgr_InstallFileSystemApiHook" is used to insert the file system request monitor 70 into the operating system as a virtual device driver so that all IFSFN_OPEN (file open), IFSFN_CLOSE (file close) and IFSFN_WRITE (file write) operations are trapped for the file system request monitor 70. What this means is that when any of the foregoing operations are detected by the operating system 44 mentioned above, the file system request monitor 70 is invoked. For complete details concerning how to install a process in these operating systems using the API hook described above, reference is made to Stan Mitchell, *Inside the Windows 95*

*File System*, O'Reilly & Associates, ISBN: 156592200X, in particular, Chapter 7—"Monitoring File Activity" and "MS-DOS/Win32 File System Driver Reference"—in Microsoft Windows® 98 Device Driver Kit, which are expressly incorporated herein by reference.

When an IFSFN_OPEN is detected, the file system request monitor 70, when invoked in the operating system 44 environment of Windows® 95, Windows® 98, or Windows® Me, performs the following tasks:

(1) Determine the file name from the file system request.
(2) Determine if the file name matches a file to be monitored by comparing the name to the list maintained in the monitor resource store 74. If not, the call is ignored and control is returned to the operating system 44.
(3) Access the look-up store 76 to determine if there exists a log record store 72 for this file. If not, generate a fresh log record store name and add an entry to the look-up store 76 mapping the file name being monitored to the name of the log record store 72.
(4) Make a file "open" request to the log record store 72.
(5) Add two entries to the handle table maintained in memory and used by the file system request monitor 70. The entries are a handle of the file from the open request being processed in steps 1 to 4 and 6 and a handle of the log record store 72 returned in the "open" call in step 4.
(6) Return control to the operating system 44.

When an IFSFN_WRITE is detected, the file system request monitor 70, when invoked in the operating system 44 environment of Windows® 95, Windows® 98, or Windows® Me, performs the following tasks:

(1) After the operating system 44 performs the write operation, determine if the write was successful. If it was not, control is returned to the operating system 44.
(2) Lookup the handle of the file in the handle table. If the file name handle is not found in this table, then the file is not being monitored. Return control to the operating system 44.
(3) If the handle is found, go to or find the end of the log record store 72 and make the write entry into the log record store 72 using the log file name handle located in step 2.

When an IFSFN_CLOSE is detected, the file system request monitor 70, when invoked in the operating system 44 environment of Windows® 95, Windows® 98, or Windows® Me, performs the following tasks:

(1) Determine if the file was closed successfully. If not, return control to the operating system 44.
(2) Lookup the handle of the file in the handle table. If the file name handle is not found in this table, then the file is not being monitored. Return control to the operating system 44.
(3) Issue a "close" request corresponding to the log file name handle looked up in step 2. Remove the entry corresponding to the handle of the file, and the corresponding "log file name handle" in the handle table.

In an exemplary embodiment for a second set of operating systems—Windows NT® and Windows® 2000—the file system request monitor 70 is installed as a filter driver into the operating system 44. This is only meant to be exemplary. It is contemplated that there are other methods that are within the scope of the present invention. For complete details concerning how to install a process as a filter driver in these operating systems, reference is made to Rajeev Nagar, *Windows NT File System Internals: A Developer's Guide*, O'Reilly & Associates; ISBN: 1565922492, in particular, Chapter 12—"Filter Drivers," Microsoft Windows NT® IFS Kit and Microsoft Windows 2000 IFS Development Kit, which are expressly incorporated herein by reference.

The file system request monitor 70 is triggered after layering over any local file systems through the monitor filter driver. There is a thread constantly waiting to see if a local file system has come up. When the local file system comes up, a new device is created by the file system request monitor 70 that attaches over the local file system using an API call known as "IoAttachDeviceByPointer." This API call allows the file system request monitor 70 to attach over the file system calls so that all the calls going to the file system trap to the file system request monitor 70 giving it a chance to monitor file system calls. When any of IRP_MJ_CREATE (open file), IRP_MJ_CLOSE (close file), IRP_MJ_WRITE (write file) operations are detected by the operating system 44 mentioned above, the file system request monitor 70 is invoked.

When an IRP_MJ_CREATE is detected, the file system request monitor 70, when invoked in the operating system 44 environment of Windows NT® and Windows® 2000, performs the same tasks described above for the IFSFN_OPEN operation in the operating system 44 environment of Windows® 95, Windows® 98, or Windows® Me. Similarly, when an IRP_MJ_WRITE is detected, the file system request monitor 70, when invoked in the operating system 44 environment of Windows NT® and Windows® 2000, performs the same tasks described above for the IFSFN_WRITE operation in the operating system 44 environment of Windows® 95, Windows® 98, or Windows® Me. Also, when an IRP_MJ_CLOSE is detected, the file system request monitor 70, when invoked in the operating system 44 environment of Windows NT® and Windows® 2000, performs the same tasks described above for the IFSFN_CLOSE operation in the operating system 44 environment of Windows® 95, Windows® 98, or Windows® Me.

Based upon the foregoing, it should be understood by one skilled in the art that the present invention can be utilized to backup and synchronize files in a number of computing environments ranging from a single user computer that stores files on a hard drive and some form of secondary storage, e.g., a zip drive, to a corporate setting where a number of computers are interconnected to a number of server computers via an intranet. Specifically, the present invention can be used to synchronize or backup files from the hard drive of a standalone computer to a removable media drive, or to a second hard drive on the system.

Moreover, it should be apparent to one skilled in the art that the foregoing backup and synchronization processes are application independent. Because the file system request monitor 70 can be part of or readily accessible to the operating system 44, it does not matter which type of application program is modifying files. So long as the application program is one supported by the operating system 44 the present invention can be employed.

Although the present invention has been described in terms of exemplary embodiments and alternatives, it will be appreciated that various modifications and alterations might be made by those skilled in the art without departing from the spirit and scope of the invention. The invention should, therefore, be measured in terms of the claims which follow.

What is claimed is:

1. An application independent method for monitoring changes by an application program while accessing a first copy of a selected file stored in a first memory of a first computer and synchronizing the first copy of the selected file with a second copy of the selected file stored in a second memory of a second computer, the first and the second computer coupled by a communications link, the method comprising the steps of:

(a) in response to receiving a request from an application program to access the first copy of the selected file, determining if the selected file is one of a plurality of preselected files designated to be monitored by comparing an identification for the selected file with data stored in a third memory concerning the plurality of preselected files to be monitored;

(b) if it is determined that the selected file is one of the preselected files, determining if the request to access the file is a write access request, said write access request including first change data representative of a first change to the first copy of the selected file;

(c) if the request for access to the file is a write access request
  (i) storing the first change data in a log file; and
  (ii) generating a time stamp representative of when the first change data is stored in the log file;

(d) repeating steps (a), (b) and (c) so that a plurality of changes are stored in the log file, each of the plurality of changes comprising change data representative of a change to the first copy of the selected file and a time stamp representative of when each of the plurality of changes to the first copy of the selected file is stored in the log file;

(e) determining if the first copy of the selected file is open or closed;

(f) if the first copy of the selected file is closed, synchronizing the first copy and the second copy of the selected file by applying all of the plurality of changes to the second copy of the selected file; and (g) if the first copy of the selected file is not closed,
  (i) examining the time stamps for the plurality of changes and using the time stamps to select at least one of the plurality of changes but less than all of the plurality of changes, and
  (ii) applying the at least one of the plurality of changes but less than all of the plurality of changes to the second copy of the file.

2. The method according to claim 1 wherein the first computer is a client computer and the second computer is a server computer.

3. The method according to claim 1 wherein the first computer is a server computer and the second computer is a client computer.

4. The method of claim 1 further comprising scanning the time stamps for the plurality of changes to find a quiet period, wherein a quiet period is a time gap of greater than a predetermined amount of time between changes.

5. The method of claim 4 further comprising applying all the changes of the plurality of changes that preceded the quiet period in time to the second copy of the selected file.

6. The method of claim 5 further comprising moving all the changes of the plurality of changes that followed the quiet period in time to a new log file.

7. A computer readable medium comprising a computer program for monitoring for requests by an application program to access a first copy of a selected file stored in a first memory of a first computer and synchronizing the first copy of the selected file with a second copy of the selected file stored in a second memory of a second computer, the first and the second computer coupled by a communications link, by performing the steps of:

(a) in response to receiving a request from an application program to access the first copy of the selected file, determining if the first copy of the selected file is one of a preselected files designated to be monitored;

(b) if it is determined that the first copy of the selected file is one of the preselected files, determining if the request to access the selected file is a write access request, said write access request including change data representative of a first change to the first copy of the selected file;

(c) if the request for access to the file is a write access request
  (i) storing the change data for the first change in a log file; and
  (ii) generating a time stamp representative of when the first change is stored in the log file;

(d) repeating steps (a), (b) and (c) so that a plurality of changes are stored in the log file, each of the plurality of changes comprising change data representative of a change to the first copy of the selected file and a time stamp representative of when each of the plurality of changes to the first copy of the selected file is stored in the log file;

(e) if the first copy of the selected file is closed, synchronizing the first copy and the second copy of the selected file by applying all of the plurality of changes to the second copy of the selected file; and (f) if the first copy of the selected file is not closed, (i) examining the time stamps for one or more of the plurality of changes and using one or more of the time stamps to select a portion of the plurality of changes which includes at least one change but is less than all of the plurality of changes, and (ii) applying the portion of the plurality of changes to the second copy of the selected file.

8. The method according to claim 7 wherein the first computer is a client computer and the second computer is a server computer.

9. The method according to claim 7 wherein the first computer is a server computer and the second computer is a client computer.

* * * * *